(12) United States Patent
Müller et al.

(10) Patent No.: US 7,320,582 B2
(45) Date of Patent: Jan. 22, 2008

(54) ENCAPSULATING FIBROUS INSERTS WITH MOLDING MATERIAL

(75) Inventors: Stefan Alois Müller, Wiesentheid (DE); Jeffrey Douglas MacDonald, North York (CA); Robin Alexander Arnott, Alliston (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 0 days.

(21) Appl. No.: 11/324,569

(22) Filed: Jan. 3, 2006

(65) Prior Publication Data

US 2007/0152380 A1    Jul. 5, 2007

(51) Int. Cl.
*B29C 45/14* (2006.01)

(52) U.S. Cl. ............... 425/112; 425/126.1; 425/317; 425/576; 425/577

(58) Field of Classification Search .......... 425/112, 425/126.1, 317, 576, 577
See application file for complete search history.

(56) References Cited

U.S. PATENT DOCUMENTS

| | | | | | |
|---|---|---|---|---|---|
| 2,859,936 | A | * | 11/1958 | Warnken | 416/225 |
| 3,480,498 | A | * | 11/1969 | Paul, Jr. | 156/175 |
| 3,843,759 | A | * | 10/1974 | Keeham | 264/135 |
| 4,659,071 | A | * | 4/1987 | Woltron | 267/149 |
| 4,876,050 | A | * | 10/1989 | Horton | 264/102 |
| 5,261,980 | A | * | 11/1993 | Pearce | 156/173 |
| 5,393,215 | A | | 2/1995 | Donovan, Sr. et al. | |
| 5,630,971 | A | * | 5/1997 | Ophir | 264/101 |
| 5,837,301 | A | * | 11/1998 | Arnott et al. | 425/574 |
| 6,495,091 | B1 | | 12/2002 | Manson et al. | |
| 2004/0021247 | A1 | | 2/2004 | Habisreitinger et al. | |
| 2004/0222555 | A1 | | 11/2004 | Puniello et al. | |
| 2005/0156352 | A1 | | 7/2005 | Burkle et al. | |

* cited by examiner

*Primary Examiner*—Robert B. Davis

(57) ABSTRACT

Disclosed is a molding system. According to an aspect, the molding system includes molding-system elements configured to process a molding material. The molding system includes a mold surface configured to cooperate with the molding-system elements. The molding system also includes a fibrous-insert generating mechanism configured to generate a fibrous insert onto the mold surface. The mold surface, in use, encapsulates the fibrous insert received by the mold surface with the molding material, at least in part.

72 Claims, 16 Drawing Sheets

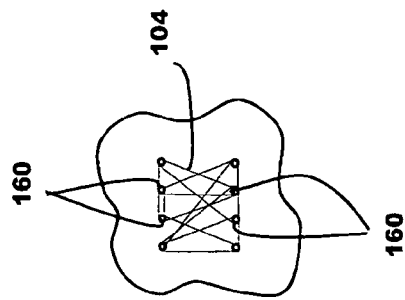
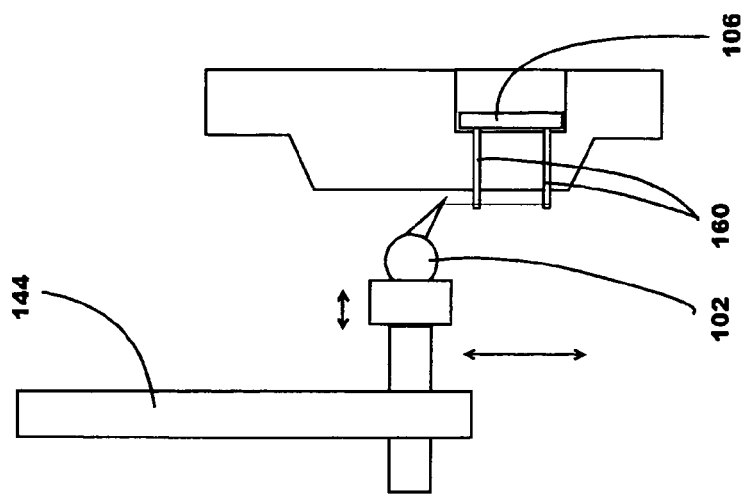
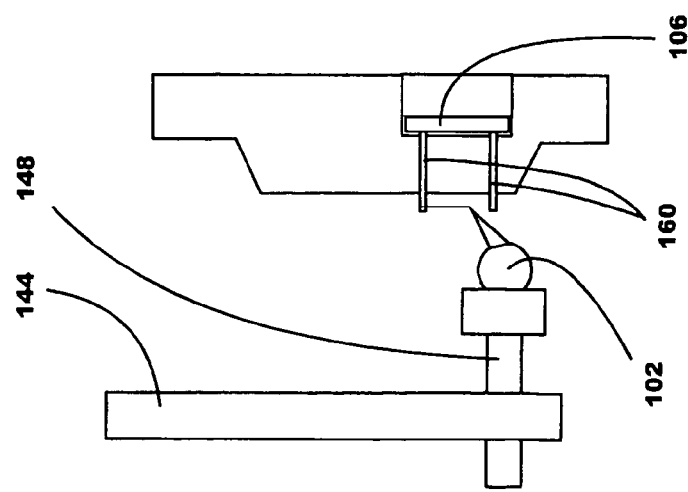
Figure 8c
Figure 8b
Figure 8a

ENCAPSULATING FIBROUS INSERTS WITH MOLDING MATERIAL

TECHNICAL FIELD

The present invention generally relates to molding systems, and more specifically the present invention relates to, but is not limited to, encapsulating a fibrous insert with a molding material.

BACKGROUND

There is a growing demand for glass reinforced thermoplastics parts, particularly in the automotive industry. Glass fibers are used to reinforce the basic thermoplastic structure to improve the strength and impact resistance of the finished part. There are various methods of combining the glass fibers with the plastic. Molders of reinforced thermoplastics using direct long-fiber compounding are seeking a technology that allows the molder to produce a glass-mat thermoplastic (GMT) composite sheet. This development is driven by a desire to reduce raw-material costs by not having to buy a preconfigured sheet. Do-it-yourself compounding also gives GMT molders a means of reusing their scrap. Further savings can be gained by an immediate transfer of a freshly-made GMT sheet into a press while still pliable, which eliminates a need to reheat the sheet in a reheat oven.

Most current methods provide a glass/plastic matrix that is consistent throughout the geometry of the part. But there is considerable expense in creating a glass/plastic matrix and usually the same reinforced properties are not needed over the whole geometry of the part as only specific areas of the part need the greater reinforcement provided by the glass sheet.

U.S. patent application Ser. No. 2005/0156352A1 (Inventor: Burkle et al; Assignee: Krauss-Maffei Kunststofftechnik GmbH) discloses a multi-stage injection molding process for production of multi-component reinforced plastic products involves forming a fiber preform in one area of an injection machine before moving to a molding area. Disadvantageously, since an endless band (which is a fibrous insert) is fed continuously into a molding machine, material is cut from the endless band to keep the endless band moving continuously through the molding machine, which permits subsequent portions of the band to be used in molding many articles. This arrangement leads to wasting fibrous material, and is potentially more costly to operate.

U.S. patent application Ser. No. 2004/0021247A1 (Inventor: Habisreitinger et al) discloses a press molding method for producing plastic shells from fiber-reinforced duroplastics. The method includes feeding sections of fiber mat into a molding press, spraying on resin onto the mat, closing the mold, allowing the resin to cure and trimming flash from molding. Disadvantageously, this reference teaches cutting excess material from an insert or molding. This arrangement leads to wasting fibrous material, and is potentially more costly to operate.

U.S. Pat. No. 6,495,091 (Inventor: Manson et al) discloses the manufacture of polymer or composite products while eliminating intermediate processing stages by combining at least two potential conversion steps for polymeric based composite manufacture, from reinforcing materials and matrices to finished products. Disadvantageously, this reference teaches cutting excess material from an insert. This arrangement leads to wasting fibrous material, and is potentially more costly to operate.

SUMMARY

In a first aspect of the present invention there is provided a molding system, including molding-system elements configured to process a molding material, a mold surface configured to cooperate with the molding-system elements, and a fibrous-insert generating mechanism configured to generate a fibrous insert onto the mold surface, the mold surface, in use, encapsulates the fibrous insert received by the mold surface with the molding material, at least in part.

In a second aspect of the present invention, there is provided a molding system, including a fibrous-insert generating mechanism configured to generate a fibrous insert onto a mold surface, the mold surface, in use, encapsulates the fibrous insert received by the mold surface with a molding material, at least in part, the molding material processed by molding-system elements, the mold surface configured to cooperate with the molding-system elements.

In a third aspect of the present invention, there is provided a molding system, including a fiber-receiving fixture configured to cooperate with a mold surface, and cooperate with a fibrous-insert generating mechanism configured to generate a fibrous insert onto a mold surface, the mold surface, in use, encapsulates the fibrous insert received by the mold surface with a molding material, at least in part, the molding material processed by molding-system elements, the mold surface configured to cooperate with the molding-system elements.

In a fourth aspect of the present invention, there is provided a molded article, including a molding material, and a fibrous insert encapsulated by the molding material, at least in part, the molding material handled by a molding system, including molding-system elements configured to process a molding material, a mold surface configured to cooperate with the molding-system elements, and a fibrous-insert generating mechanism configured to generate the fibrous insert onto the mold surface, the mold surface, in use, encapsulates the fibrous insert received by the mold surface with the molding material, at least in part.

In a fifth aspect of the present invention, there is provided a process of molding, including processing a molding material, generating a fibrous insert onto a mold surface, and encapsulating the fibrous insert received by the mold surface with a molding material, at least in part.

In a sixth aspect of the present invention, there is provided a device of a molding system, including a fiber-receiving fixture configured to cooperate with a fibrous-insert generating mechanism configured to generate a fibrous insert onto the fiber-receiving fixture, and a fiber-transfer mechanism configured to transfer the generated fibrous insert from the fiber-receiving fixture to another fiber-receiving fixture extending from a mold surface, wherein the molding system includes molding-system elements configured to process a molding material, wherein the mold surface is configured to cooperate with the molding-system elements, and encapsulate the fibrous insert received by the mold surface with the molding material, at least in part.

A technical effect of the aspects of the present invention is reduced scrap in view of known methods that permit removal of unwanted fibrous material from a pre-made fibrous insert. The fibrous insert is generated to have a predetermined attribute (such as, but not limited to shape, weight, and/or density, etc), prior to encapsulating the fibrous insert at least in part. This arrangement permits selective and/or optimized reinforcement of a molded article.

BRIEF DESCRIPTION OF THE DRAWINGS

A better understanding of the exemplary embodiments of the present invention (including alternatives and/or variations thereof) may be obtained with reference to the detailed description of the exemplary embodiments along with the following drawings, in which:

FIGS. 8A, 8B and 8C illustrate, schematically, a fibrous-insert generating mechanism used in the molding system of FIG. 2 for generating and/or winding a fibrous insert on a fiber-receiving fixture;

REFERENCE NUMERALS USED IN THE DRAWINGS

Figure 1:
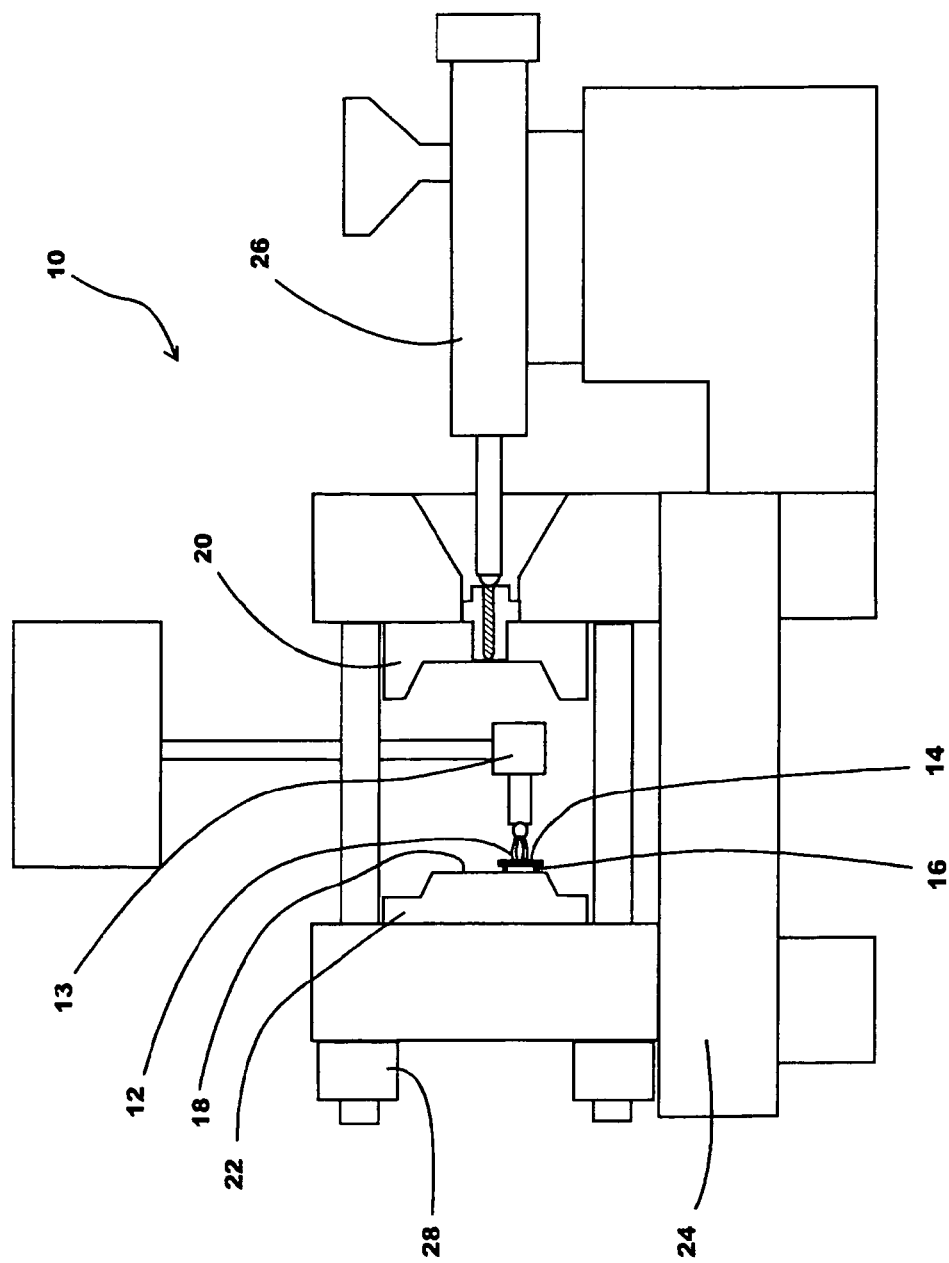
FIG. 1 is a side view of a molding machine according to a first embodiment.

The following is a listing of the elements designated to each reference numerals used in the drawings.

| | |
|---|---|
| molding machine 10 | a fibrous-insert generating mechanism 12 |
| end-of-arm-tool 13 | fibrous insert 14 |
| fiber-receiving fixture 16 | mold surface 18 |
| primary mold 20 | secondary mold 22 |
| mold-supporting assembly 24 | injection unit 26 |
| clamping mechanism 28 | molding machine 100 |
| fibrous-insert generating mechanism 102 | end-of-arm-tool 103 |
| fibrous insert 104 | fiber-receiving fixture 106 |
| mold surface 108 | primary mold half 110 |
| secondary mold 112 | secondary mold 113 |
| mold-supporting assembly 114 | injection unit 116 |
| clamping mechanism 118 | injection base 120 |
| barrel 122 | feed hopper 124 |
| drive unit 126 | clamp base 128 |
| stationary platen 130 | upper tie bar 132 |
| lower tie bar 134 | rotary drive 136 |
| carrier 138 | turret block 140 |
| end-of arm-tool assembly 142 | robot arm 144 |
| end-of-arm drive 146 | end-of-arm drive 148 |
| suction cup 150 | molded part 152 |
| molded part 154 | heater 156 |
| molded part 158 | pins 160 |
| molded part 162 | mold cavity 164 |
| holder 168 | |
| module 170 | holder 172 |
| module 174 | module 176 |
| molded part 178 | secondary mold half 180 |
| secondary mold half 182 | molded part 184 |
| molded part 186 | primary mold half 188 |
| primary mold half 190 | heater 192 |

DETAILED DESCRIPTION OF THE EXEMPLARY EMBODIMENTS

FIG. 1 is a side view of a molding machine 10 according to the first embodiment of the present invention. The molding system 10 includes a fibrous-insert generating mechanism 12. The fibrous-insert generating mechanism 12 is part of an end-of-arm-tool 13. The fibrous-insert generating mechanism 12, when activated, generates a fibrous insert 14 on a fiber-receiving fixture 16 of a mold surface 18. The mold surface 18 is defined by a mold. The mold includes a primary mold half 20 and a secondary mold 22 that defines a mold cavity in cooperation with the primary mold half. The secondary mold half 22 defines the mold surface 18. In an alternative, the primary mold half 20 defines the mold surface 18. The mold cooperates with molding-system elements to encapsulates a molding material on the generated fibrous insert 14 in cooperation with the mold surface 18.

The molding-system elements include a mold-supporting assembly 24 configured to support the mold halves 20 and 22, an injection unit 26 configured to inject the molding material into a mold cavity defined by the mold halves 20 and 22, and a clamping mechanism 28 (including platens) configured to clamp the mold halves 20 and 22 together. In an alternative embodiment, the molding-system elements include any combination and permutation of the items 24, 26 and 28.

It will be appreciated that the fibrous-insert generating mechanism 12, the fiber-receiving fixture 16 and the mold surface of the mold 18 may all be supplied by multiple vendors, and the these items may be integrated by an end-user, or may all be supplied by a single vendor and integrated by the single vendor and/or the end-user.

FIG. 1 depicts the fiber-receiving fixture 16 extending from the mold surface 18. In an alternative embodiment, the fiber-receiving fixture 16 is offset from the mold surface 18 (that is, item 16 is not part of the mold surface 18), and the fiber-receiving fixture 16 cooperates with a fiber-transfer mechanism (not depicted). In this embodiment, the fibrous-insert generating mechanism 12 generates a fibrous insert onto the fixture 16, and then the fiber-transfer mechanism transfers, when so energized, the generated fibrous insert from the fiber-receiving fixture 16 to another fiber-receiving fixture (not depicted) that extends from the mold surface 18.

The fibrous insert 14 includes any one of a glass-mat component usable in a GMT (glass-mat thermoplastic) molded article, a long-fiber component usable in an LFT (long-fiber thermoplastic) molded article, a long-glass-reinforced polypropylene component, unidirectionally-aligned fibers, a preconfigured mat, and any combination and permutation thereof.

FIGS. 2, 3, 4 and 5 are side views of a molding machine 100 according to the second embodiment (which is the preferred embodiment) of the present invention.

A technical effect of the molding machine 10 is reduction of scrap by avoiding removal of unwanted fibrous material from a fibrous insert, and the fibrous insert is manufactured to have a predetermined attribute and/or attributes (such as, shape, weight, and/or density, etc) prior to the fibrous insert being encapsulated.

Figure 2:
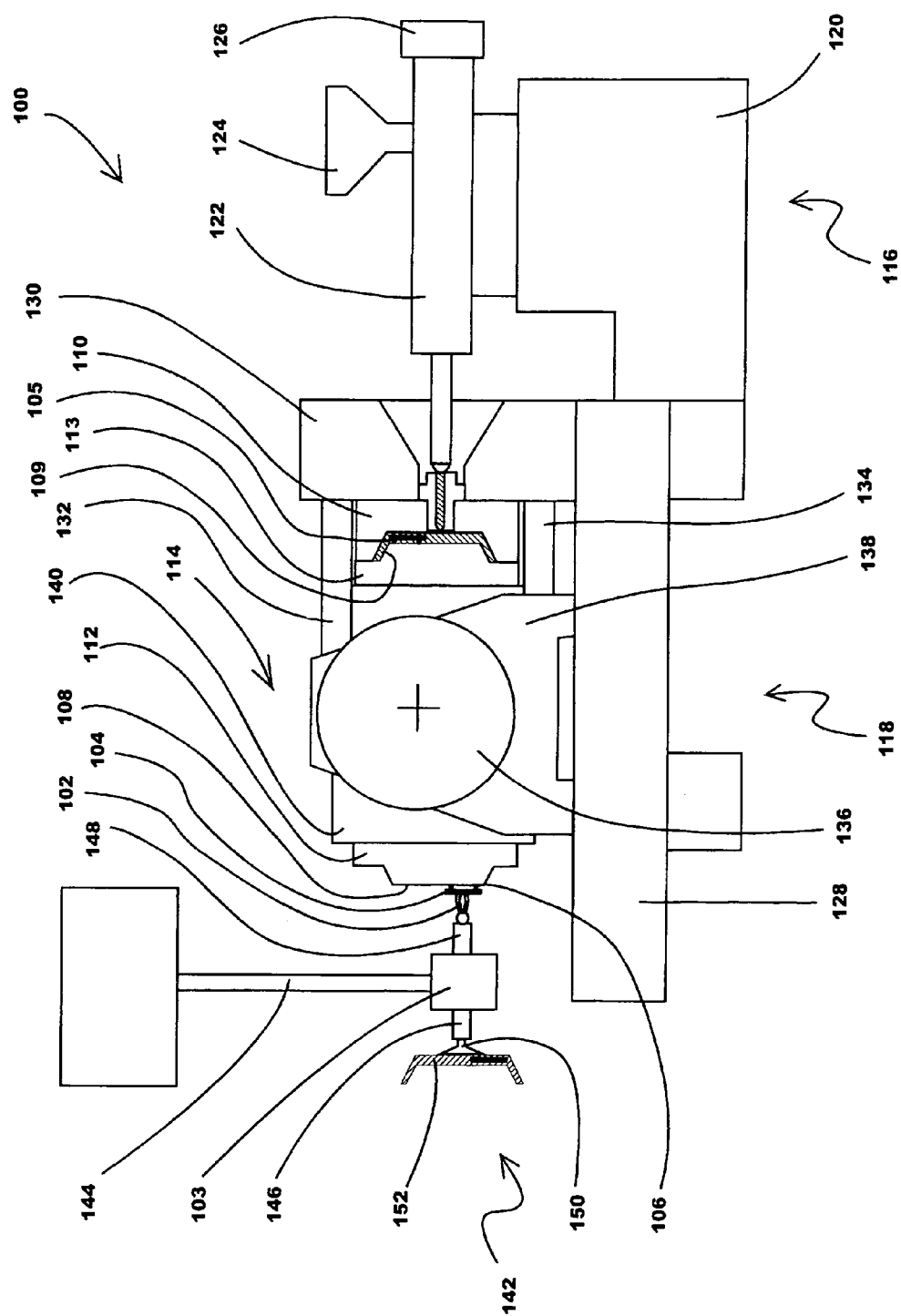
FIGS. 2, 3, 4 and 5 are side views of a molding machine according to a second embodiment.

Referring to FIG. 2, the molding system 100 includes a fibrous-insert generating mechanism 102. The fibrous-insert generating mechanism 102 is part of an end-of-arm-tool 103 (hereafter called the "EOAT" 103). The fibrous-insert generating mechanism 102, when activated, generates a fibrous insert 104 on a fiber-receiving fixture 106 of a mold surface 108. The mold surface 108 is defined by a mold. The mold includes a primary mold half 110 and a secondary mold 112. The secondary mold half 112 defines the mold surface 108. In an alternative of the embodiment, the primary mold half 110 defines the mold surface 108. The mold cooperates with molding-system elements to encapsulate the generated fibrous insert 104 with a molding material in cooperation with the mold surface 108. The advantage of the fixture 106 is that the fiber is generated and used on a portion of a mold surface that requires fibrous reinforcement, and in this way, waste of fibrous material is reduced by avoiding the cutting away of material from the fibrous insert.

According to this embodiment, the molding system 100 includes a primary mold half 110, and a set of secondary mold halves having the secondary mold half 112 and a secondary mold half 113. Each of the mold halves 112 and 113 defines the mold surface 108 and 109 respectively. Each of the mold halves 112 and 113 cooperate with the fibrous-insert generating mechanism 102. Each of the mold halves 112 and 113 moves relative to the primary mold half 110 (this will be described further below). Each of mold halves 112 and 113 encapsulate, in cooperation with the primary mold half 110 (and in cooperation with molding system elements of the molding system 100), a molding material to generated fibrous inserts 104 and 105 respectively.

The secondary mold halves 112, 113 receive, at a position offline relative to the primary mold half, a fibrous insert, and mold, at a position inline relative to the primary mold half 110, the molding material to the fibrous insert. The secondary mold halves 112, 113 are configured to be movable between an inline position and an offline position relative to the primary mold half 110.

The molding-system elements of the molding system 100 include a mold-supporting assembly 114 configured to support the mold half 112, an injection unit 116 configured to inject the molding material into a mold cavity defined by the mold halves 110 and 112, and a clamping mechanism 118 (including platens) configured to support the mold half 110 and to clamp the mold halves 110 and 112 together. In an alternative of the embodiment, the molding-system elements include any combination and permutation of the items 114, 116 and 118.

The injection unit 116 includes an injection base 120 that supports a barrel 122. The barrel 122 houses an injection screw (not depicted) used for processing a molding material (not depicted; for example: a plastic resin). The molding material is supplied to the barrel 122 through a feed hopper 124 that is attached to the barrel 122. A drive unit 126 is attached to a distal end of the barrel 122, and the drive unit 126 when energized rotates the injection screw so as to melt the molding material, then the drive unit 126 stops rotating the injection screw and begins translating the injection screw to inject an accumulation of molding material into a mold cavity defined by the mold halves 110 and 112 (that is, after the mold halves 110 and 112 are aligned and facing each other, as will be described below).

The clamp mechanism 118 includes a clamp base 128, a stationary platen 130, a pair of upper tie bars 132, a pair of lower tie bars 134, and a clamping device (not depicted) integrated with the stationary platen 130. The tie bars 132 and 134 extend from the mold-supporting assembly 114 and over to the platen 130. The clamp device, when activated, pulls the tie bars 132 and 134 which in turn pulls and clamps the mold halves together. The clamp base 128 is also used to act as a frame that supports the primary mold half 110.

The mold-supporting assembly 114 includes a rotary drive 136 mounted on a carrier 138 and rotates a turret block 140 to selectively position a set of secondary mold halves 112 and 113 both of which are attached to the turret block 140. The rotary drive 136 can also be called a mold-moving assembly that supports and moves the set of secondary mold halves 112, 113, and the moving assembly is rotated along any one of a vertically-aligned axis and a horizontally-aligned axis.

An EOAT assembly 142 is located near a distal end of the clamp mechanism 118 remote from the stationary platen 130. The EOAT assembly 142 includes the EOAT 103, a robot arm 144 and an end-of-arm drive 146 and an end-of-arm drive 148. End-of-arm drive 146 includes a suction cup 150 (or other part remove device) for holding a molded part 152. End-of-arm drive 148 includes fibrous-insert generating mechanism 102 for generating the fibrous insert 104.

In operation, the molded part 152 is molded in the mold formed by the primary mold half 110 and any one of the secondary mold half 112 or the secondary mold half 113. Molten resin from the barrel 122 is injected and encapsulates (at least in part) a fibrous insert that was generated in place in the secondary mold half 113. While the part 152 is molded, another fibrous insert is generated and placed on the secondary mold half 112.

Figure 3:
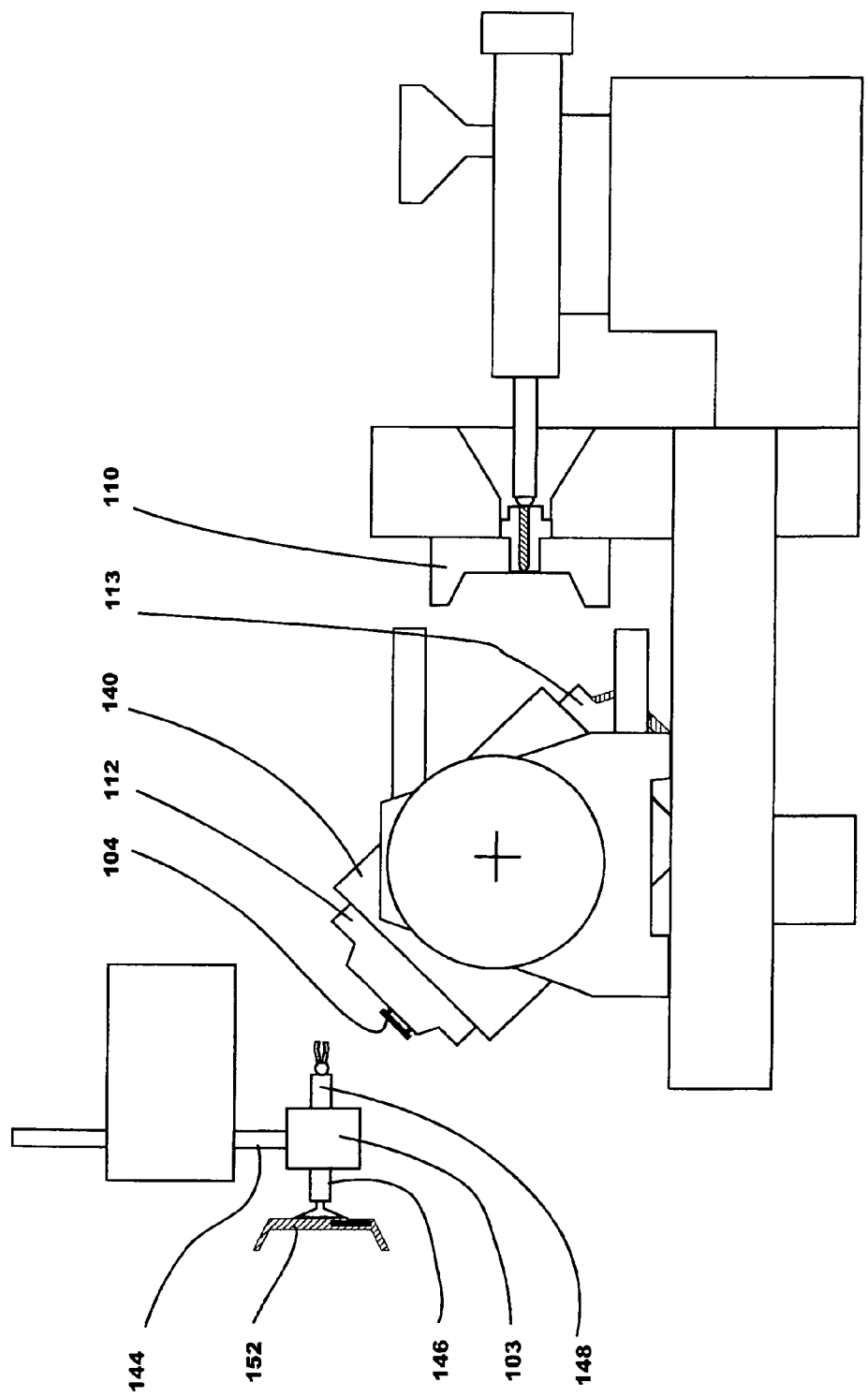

Referring to FIG. 3, when a molded part is molded and sufficiently cooled, the mold halves 110 and 113 are separated and opened, and the turret block 140 is rotated by the rotary drive 136. While the turret block 140 is rotating, the EOAT 103 retracts the robot arm 144 to withdraw the end-of-arm drives 146 and 148 from their location adjacent the turret block 140 to a part release station (not shown) associated with the drive 146 and a fiber preform pick-up station (not shown) associated with the drive 148.

Figure 4:
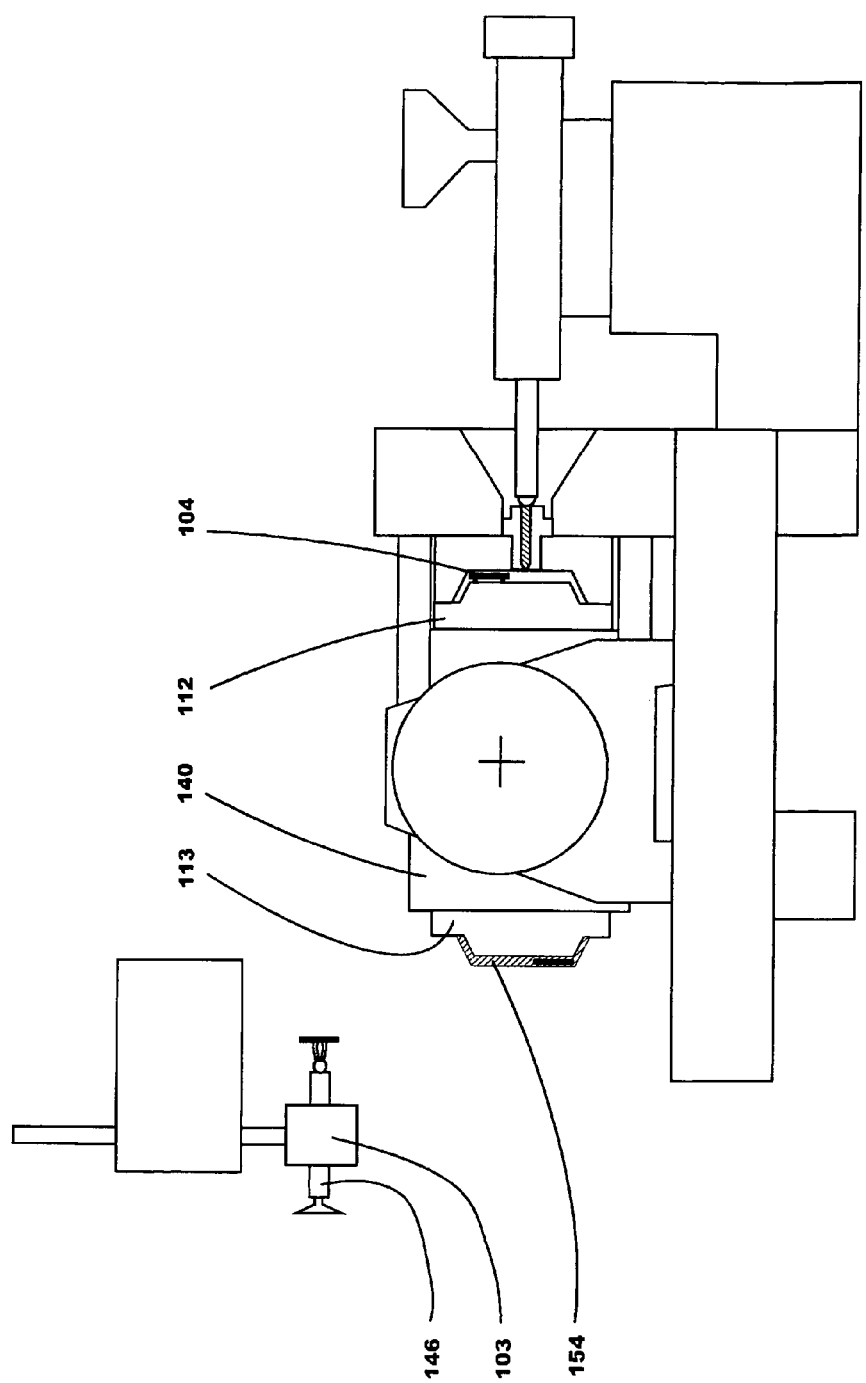

Referring to FIG. 4, when the turret block 140 completes its rotation through one hundred eighty degrees, the secondary mold half 112 holding the fibrous insert 104 is in position to form a mold cavity with the primary mold half 110 and a molded part 154 on the primary mold half 110 is in position to be removed by the end-of-arm drive 146.

Figure 5:
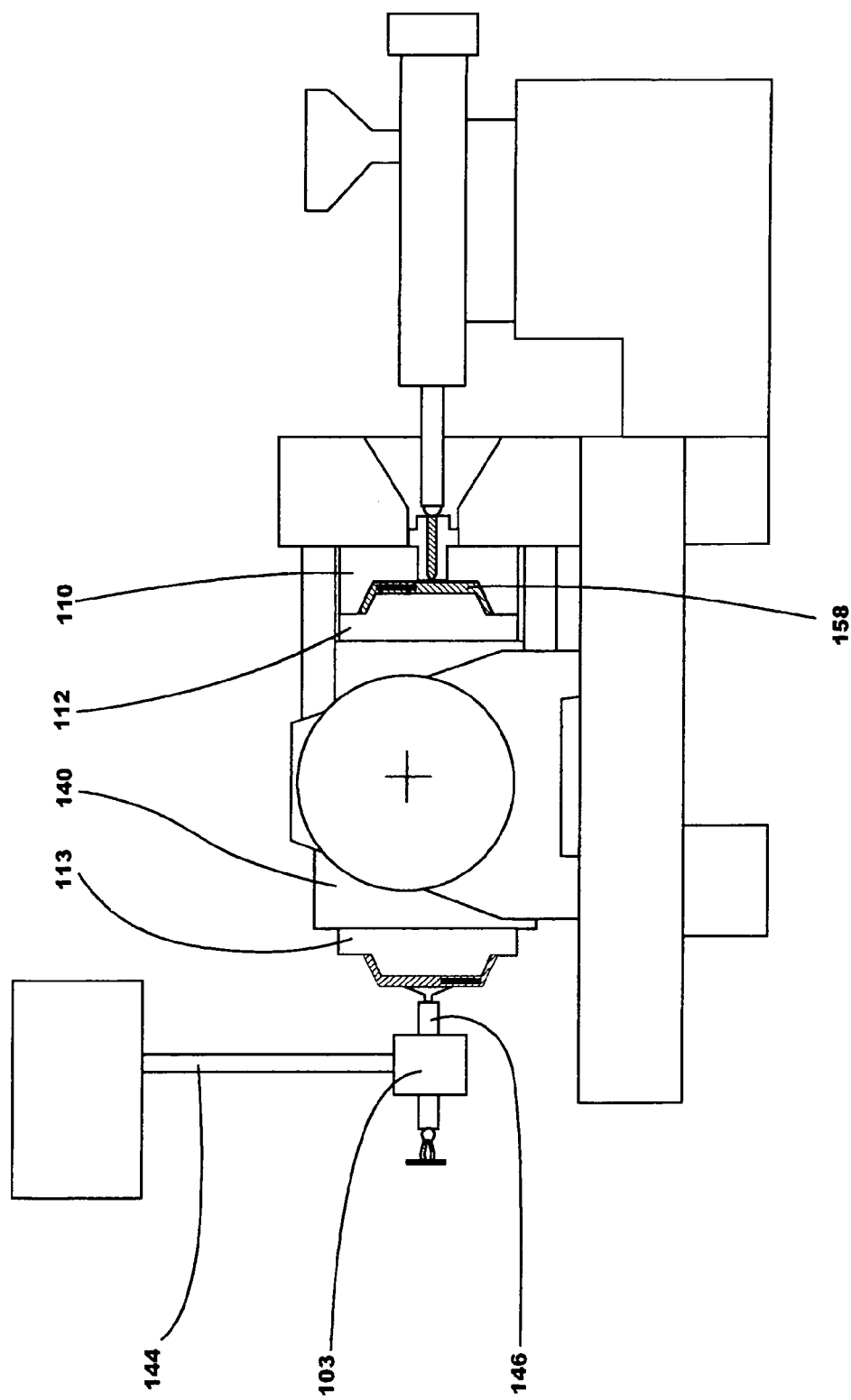

Referring to FIG. 5, the EOAT 103 extends the robot arm 144 into position adjacent the turret block 140. The end-of-arm drive 146 retrieves the molded part 154 while a new part 156 is molded in a mold cavity formed by mold halves 110 and 113. When this operation is complete, the mold halves 110 and 112 are opened and the turret block 140 is rotated back to the position shown in FIG. 2 and the cycle may be repeated to make another molded part having a fibrous insert that was generated by the fibrous-insert generating mechanism 102.

The molding machine 100 uses the fibrous-insert generating mechanism 102 to generate and a fibrous insert. The fibrous insert is placable on a fiber-receiving fixture of a mold surface by the fibrous-insert generating mechanism 102. A technical effect of the molding machine 100 is reduction of scrap by avoiding removal of unwanted fibrous material from a fibrous insert, the fibrous insert is manufactured to have a predetermined attribute and/or attributes (such as, shape, weight, and/or density, etc) prior to the fibrous insert being encapsulated (at least in part).

In an alternative embodiment of the molding machine 100, a fiber-receiving fixture (not depicted) cooperates with the fibrous-insert generating mechanism 102, the fiber-receiving fixture is configured to be offset from the mold surface, and the fiber-receiving fixture cooperates with a fiber-transfer mechanism (not depicted), and the fiber-transfer mechanism transfers the generated fibrous insert from the fiber-receiving fixture to another fiber-receiving fixture extending from the mold surface.

In an alternative embodiment, the secondary mold halves 112, 113 maintain a differential air pressure to hold a fibrous insert against a mold surface, and the differential air pressure is deactivated responsive to encapsulating a molding material to the fibrous insert.

Figure 6:
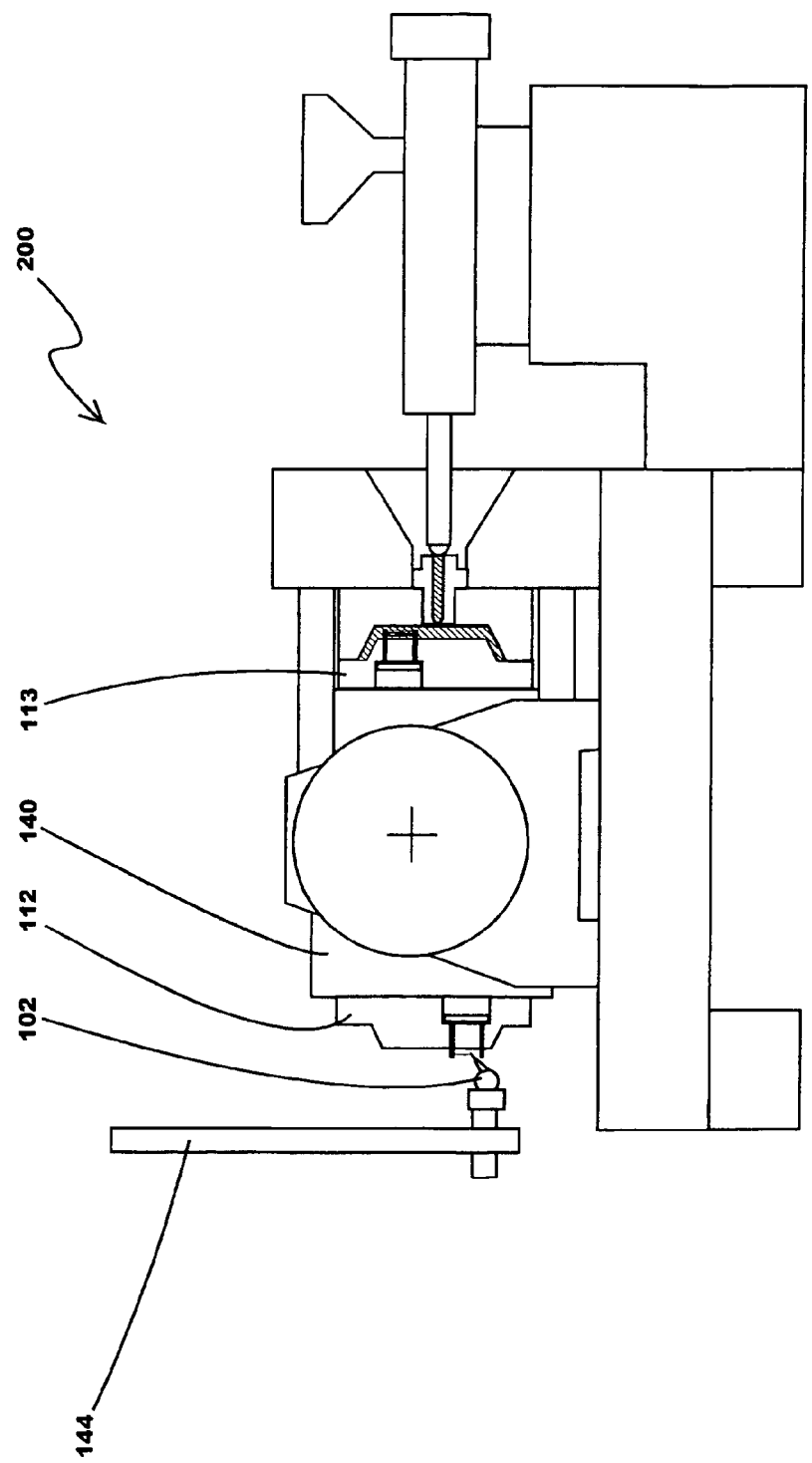
FIGS. 6 and 7 are side views of a molding machine according to a third embodiment.
Figure 7:
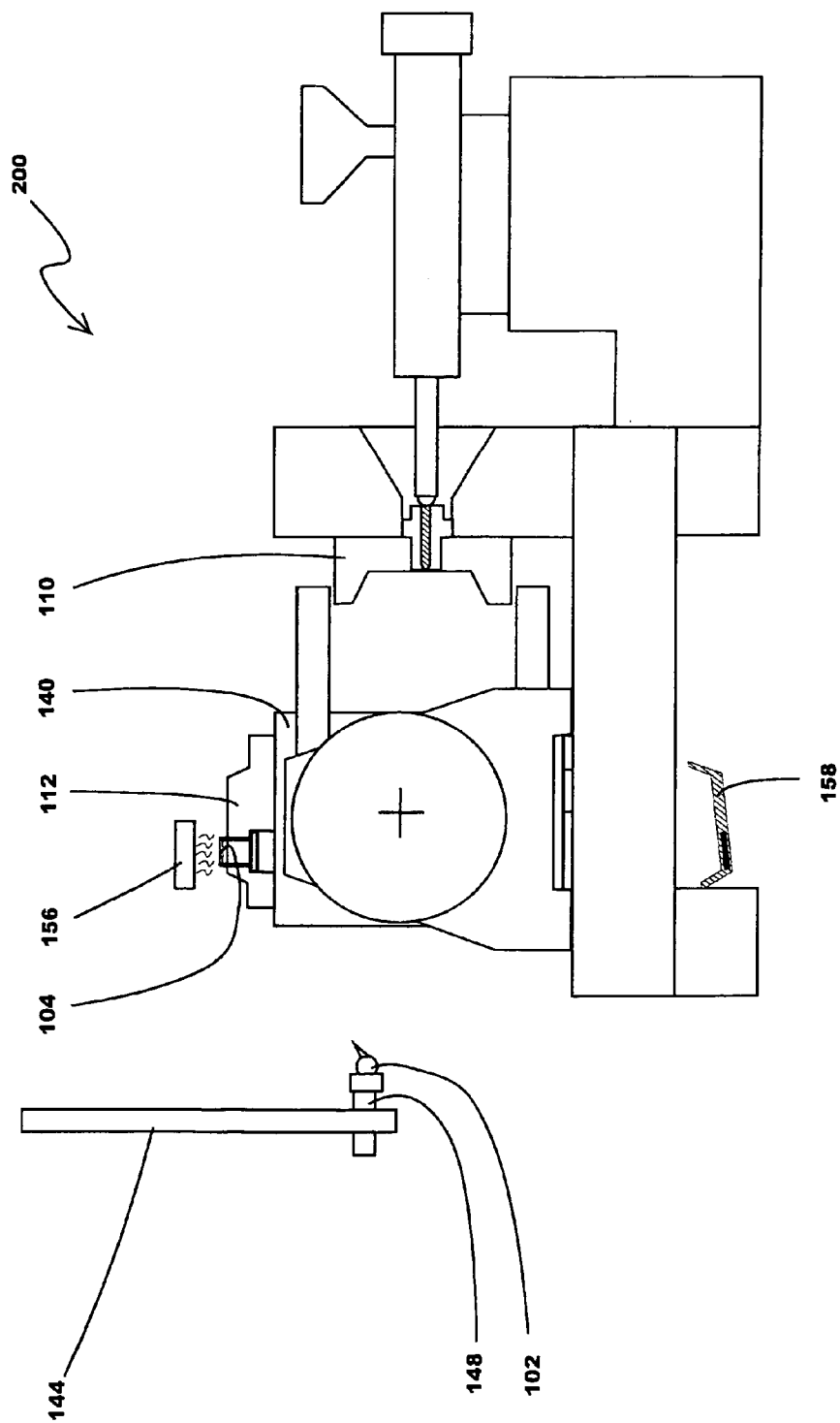

FIGS. 6 and 7 are side views of a molding machine 200 according to the third embodiment of the present invention.

The molding machine 200 is similar to the molding machine 100 of FIG. 2. However, the molding machine 200 is adapted to rotate the secondary mold halves 112 and 113 by ninety degrees in sharp contrast to the molding machine 10 and 100 that rotates its mold halves by one hundred eighty degrees.

Referring to FIG. 7, the robot arm 144 has been withdrawn and the turret block 140 is rotated through ninety degrees. In this position, the secondary mold half 112 is positioned adjacent a heater 156 that is energized to prepare the fibrous insert 104 prior to encapsulating the fibrous insert 104 with a molding material (at least in part). Also, the secondary mold half 113 has been rotated into a position below the carrier 138, and a molded part 158 can now be discharged from the molding machine 200. When heat treatment of the fibrous insert 104 is completed, the turret block 140 is rotated through a further ninety degrees to place the secondary mold half 112 cooperatively with the primary mold half 110, and to permit the fiber-generator 102 to generate, onto the secondary mold half 113, a new fibrous insert. In this manner, individually-wound reinforced fiber lines (in the form of the fibrous insert) are sequentially generated and provided to mold surfaces associated with the secondary mold halves 112 and 113. Each winding of fiber lines can be modified by modifying a control for the robot arm 144 and end-of-arm drive 148 for each change of mold to match the reinforcing fiber to a part being molded.

FIGS. 8A, 8B and 8C illustrate, schematically, a fibrous-insert generating mechanism used in the molding system of FIG. 6 for generating and/or winding a fibrous insert on a fiber-receiving fixture used in the molding system of FIG. 6. The fixture 106 has eight pins 160. The fixture 106 is received in a recess defined by the mold half. The fixture 106 may have more or fewer pins 160 depending on desired requirements. The robot arm 144 moves the end-of-arm drive 148 up and/or down and back and/or forth in a pattern corresponding to a desired fiber-reinforcing pattern for a desired molded part. The end-of-arm drive 148 can also be moved transversely so that the fiber line may be spirally wound if desired. The pin 160 is retractable in that it retracts away from the fibrous insert responsive to molding a molding material to the fibrous insert.

The fibrous-insert generating mechanism winds or generates a fiber or a roving on the fiber-receiving fixture 106 to create a desired geometry for a concentrated fibrous feature in a molded part. The following is a list of arrangements contemplated for the fixture 106. A type-1 fixture (as illustrated in FIGS. 1 to 5 inclusive) is a fixture in which the fibrous-insert generating mechanism 102 generates a fibrous insert onto the fixture 106 and then the generated fibrous insert is then removed from the fixture and placed or inserted on a mold surface. A type-2 fixture (as illustrated in FIGS. 6 to 9 inclusive) is a fixture which is transferred into and out of a mold half that defines the mold surface, and such a fixture acts as a carrier of a generated fibrous insert. A type-3 fixture (as illustrated in FIGS. 6 to 9 inclusive) is a fixture that is integrated with a mold surface, and a fibrous insert is generated directly onto the mold surface onto the fixture.

In operation, one or more fibrous inserts are generated (created) and positioned in a mold surface at an offline position (that is, offline from a primary mold half) without having to disruption cycle time and allow accurate placement of the fibrous insert.

Figure 9C:
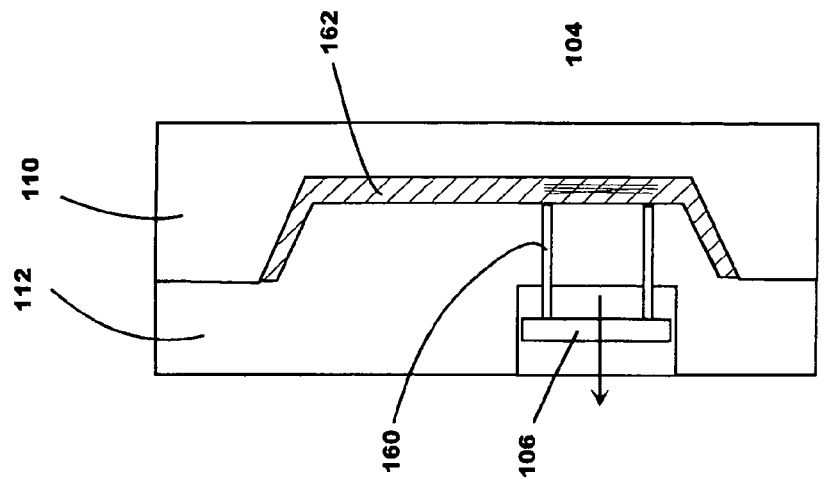
FIGS. 9A, 9B and 9C illustrate, schematically, a manner in which the fiber-receiving fixture of FIGS. 8A, 8B and 8C operates.
Figure 9B:
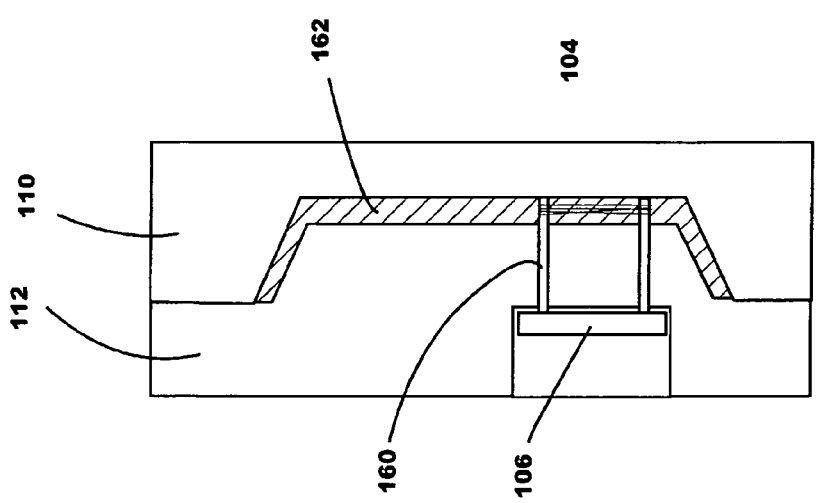
Figure 9A:
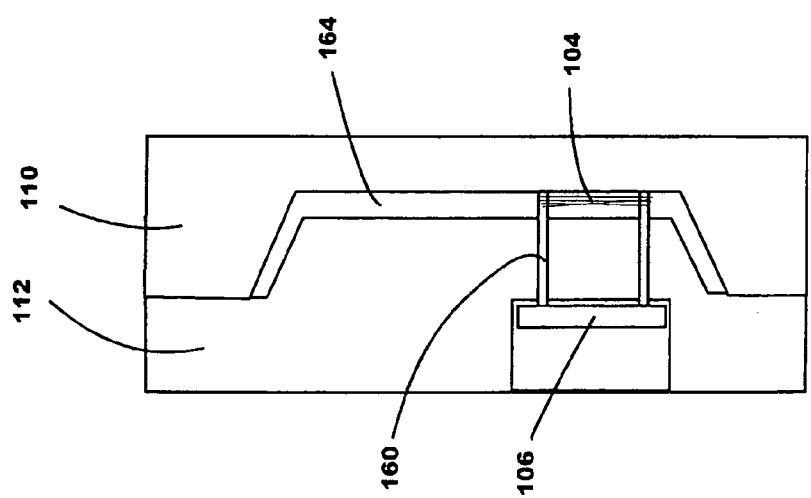

FIGS. 9A, 9B and 9C illustrate, schematically, a manner in which the fiber-receiving fixture 106 of FIGS. 8A, 8B and 8C operates the fiber-receiving fixture 106 interacts with the secondary mold half 112 so as to leave the fibrous insert 104 in its desired location in a molded part 162. As shown in FIG. 9A, the secondary mold half 112 is placed in a mold closed position facing the primary mold half 110. In this position, the fixture 106 supports the fibrous insert 104 in position in a mold cavity 164 (empty and closed) defined by the mold halves 110 and 112. As shown in FIG. 9B, the mold cavity is then filled with a molten molding material (such as: plastic) that surrounds the insert 104. The pins 160 are retracted out of the mold cavity 162 by drive means not shown to form the fiber-reinforced part 162, which is shown in FIG. 9C.

Figure 10:
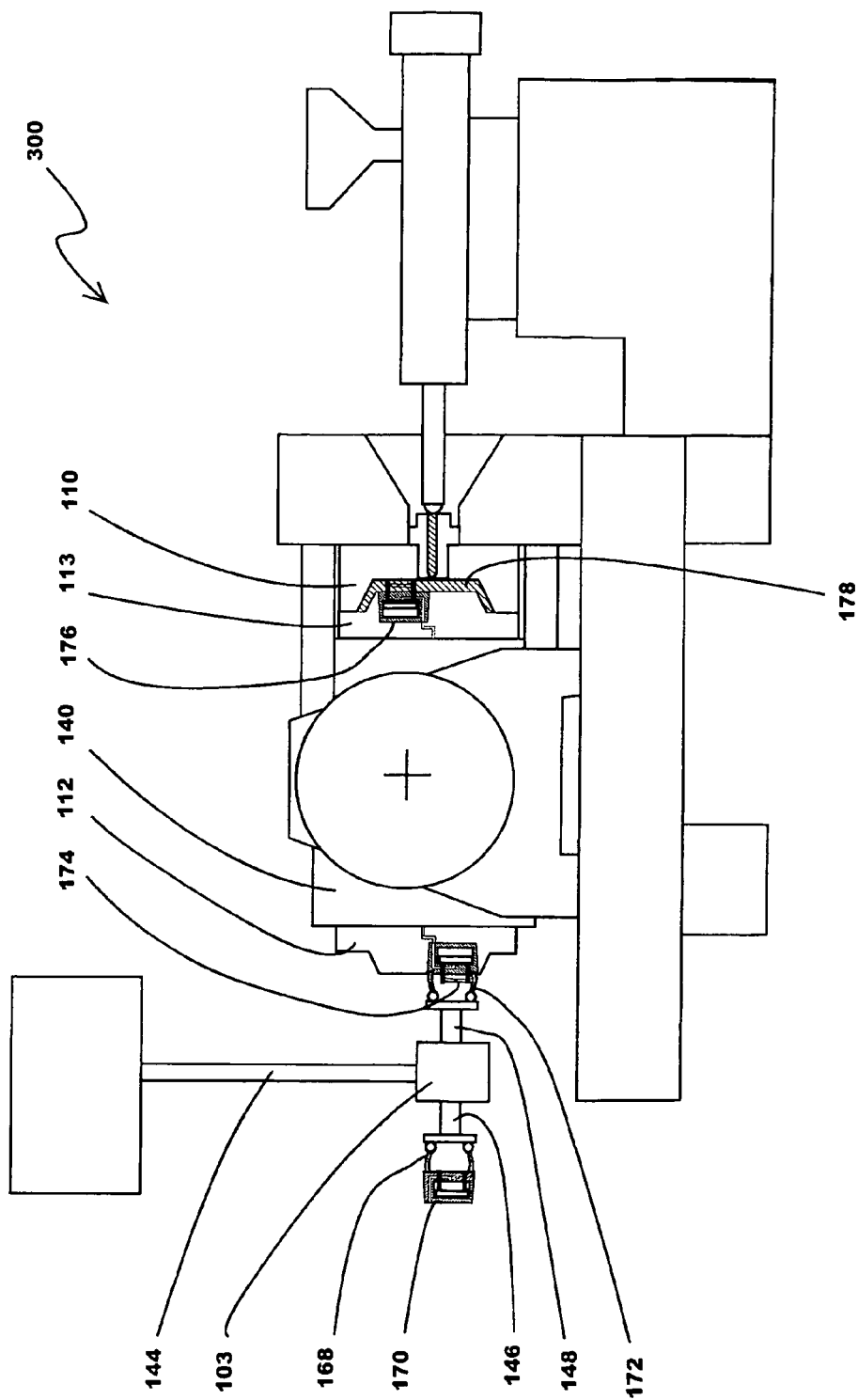
FIGS. 10, 11 and 12 are side views of a molding machine according to a fourth embodiment.
Figure 11:
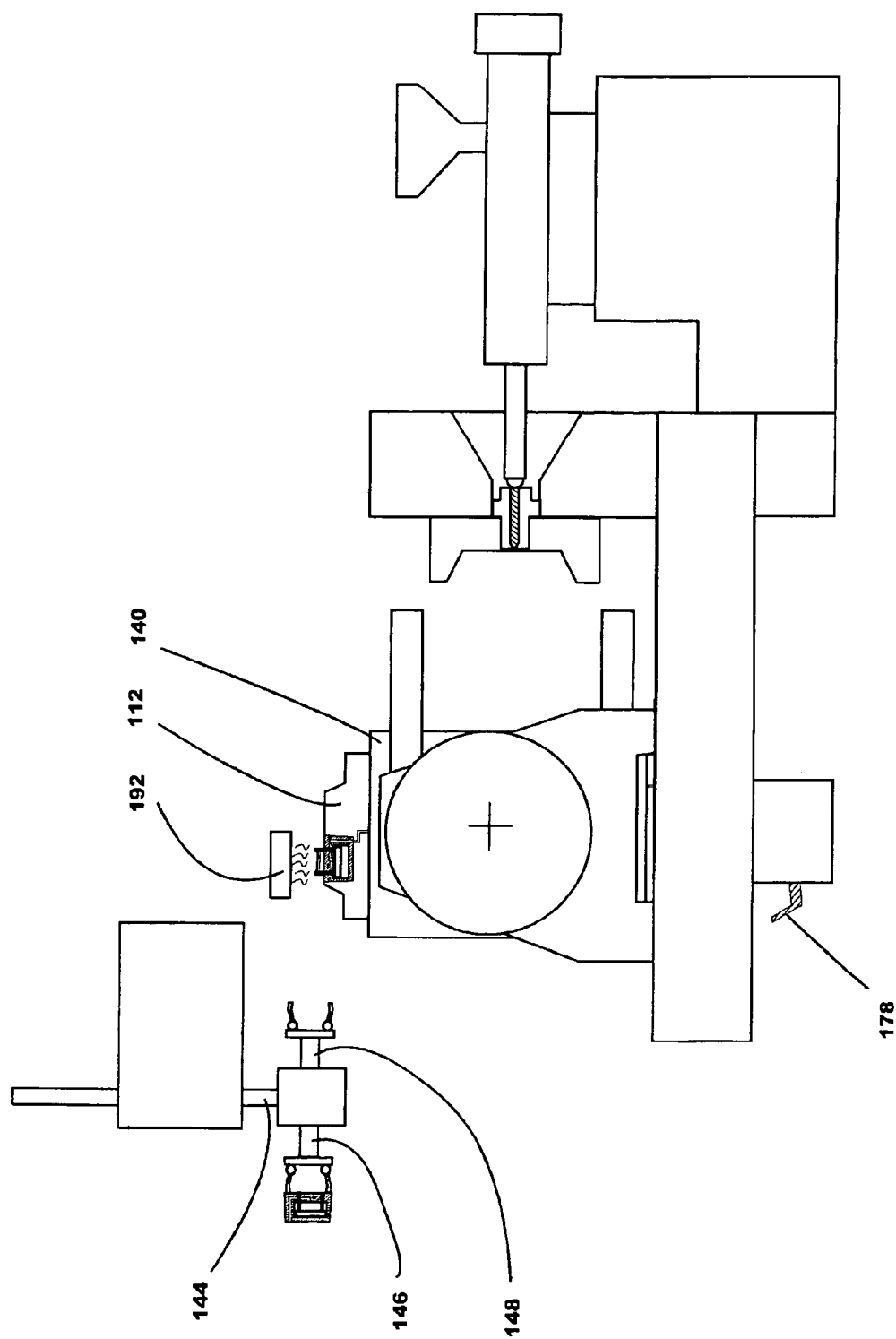
Figure 12:
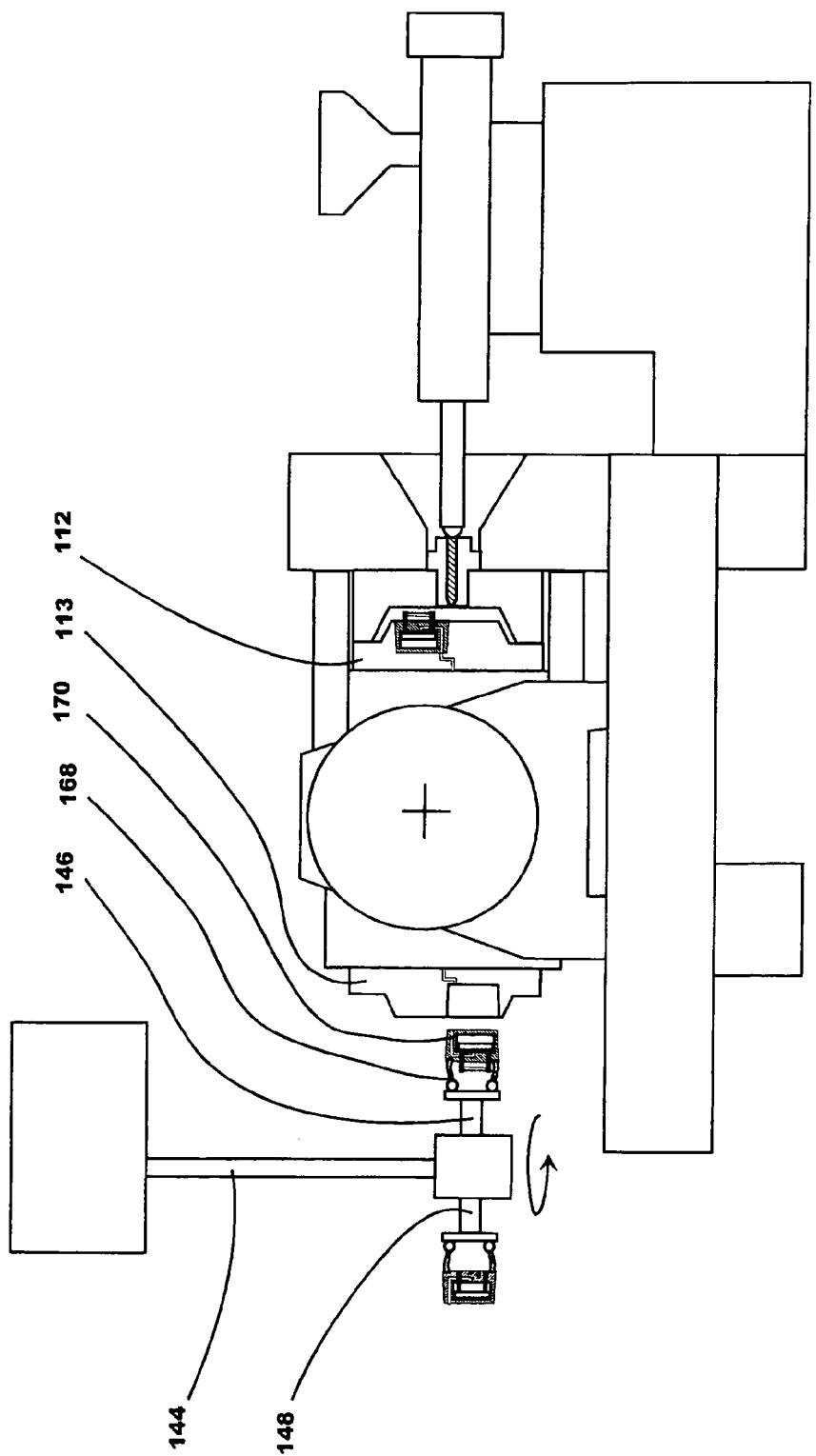

FIGS. 10, 11 and 12 are side views of a molding machine 300 according to the fourth embodiment of the present invention. The end-of-arm drive 146 has a holder 168 for holding a module 170. End-of-arm drive 148 has a holder 172 for holding a module 174. The modules 170 and 174 each perform the function of the fiber-receiving fixture 106 (of FIG. 2) with the additional function of being seperatable from the secondary mold halves 112 and 113.

As shown in FIG. 10, the end-of-arm drive 148 is placing the fibrous insert 174 in the secondary mold half 112 while a module 176 in the secondary mold half 113 is injected with melt to form a fiber-reinforced molded part 178.

As shown in FIG. 11, when molding of the part 178 is complete, the turret block 140 is rotated ninety degrees to position the secondary mold half 112 adjacent a heater 192. Movable mold half 113 likewise rotates ninety degrees to a position where the molded part 178 can be discharged from the molding machine 300. During this interval, the end-of-arm drives 146 and 148 are withdrawn to a position where the now empty drive 148 can retrieve another module (not depicted).

As shown in FIG. 12, the robot arm 144 is rotated and the arm 144 lowers the drives 146 and 148 to a position adjacent the secondary mold half 113. In this position the module 170 in the holder 168 on arm 146 can be placed in the mold half 113 and the molding process repeated to mold a part in a mold cavity defined by the mold halves 112 and 113.

FIGS. 13, 14, 15 and 16 are top views a molding machine 400 according to the fifth embodiment of the present invention. The molding machine 400 is similar to the molding machine 100 of FIG. 2, and the differences is described below.

Figure 13:
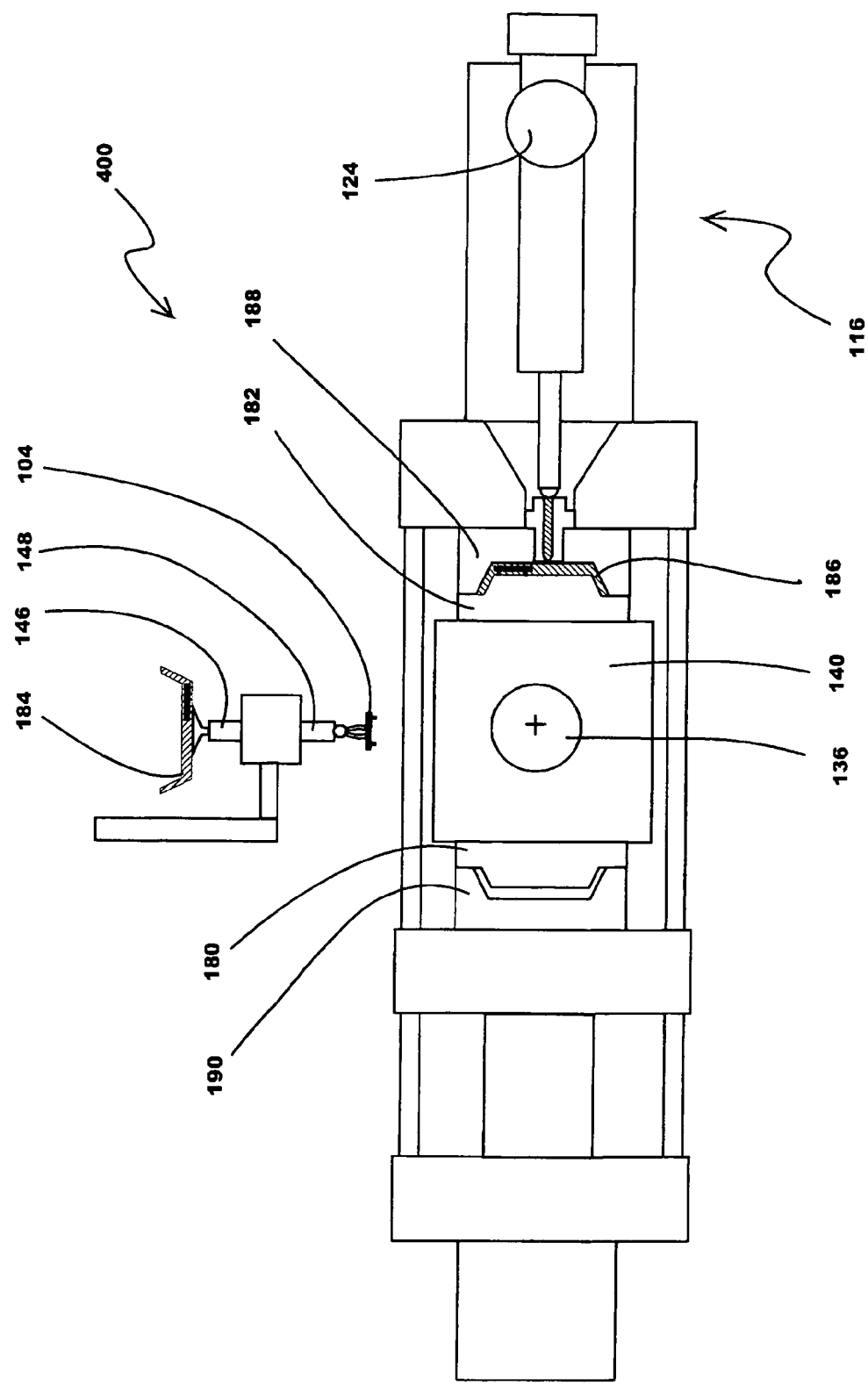
FIGS. 13, 14, 15 and 16 are top views of a molding machine according to a fifth embodiment.

Referring to FIG. 13, the rotary drive 136 rotates the turret block 140 on a vertical axis. The end-of-arm drive 148 places fibrous insert 104 on secondary mold halves 180, 182, and end-of-arm drive 146 retrieves a molded part 184 from the secondary mold halves 180 and 182. The end-of-arm drive 148 has generated the fibrous insert 104 and is now ready to place the insert 104 on a mold surface of the secondary mold half 180. The end-of-arm drive 146 is in position to release the molded part 184, and a molded part 186 is molded in a mold cavity defined by the secondary mold half 182 and a primary mold half 188.

Figure 14:
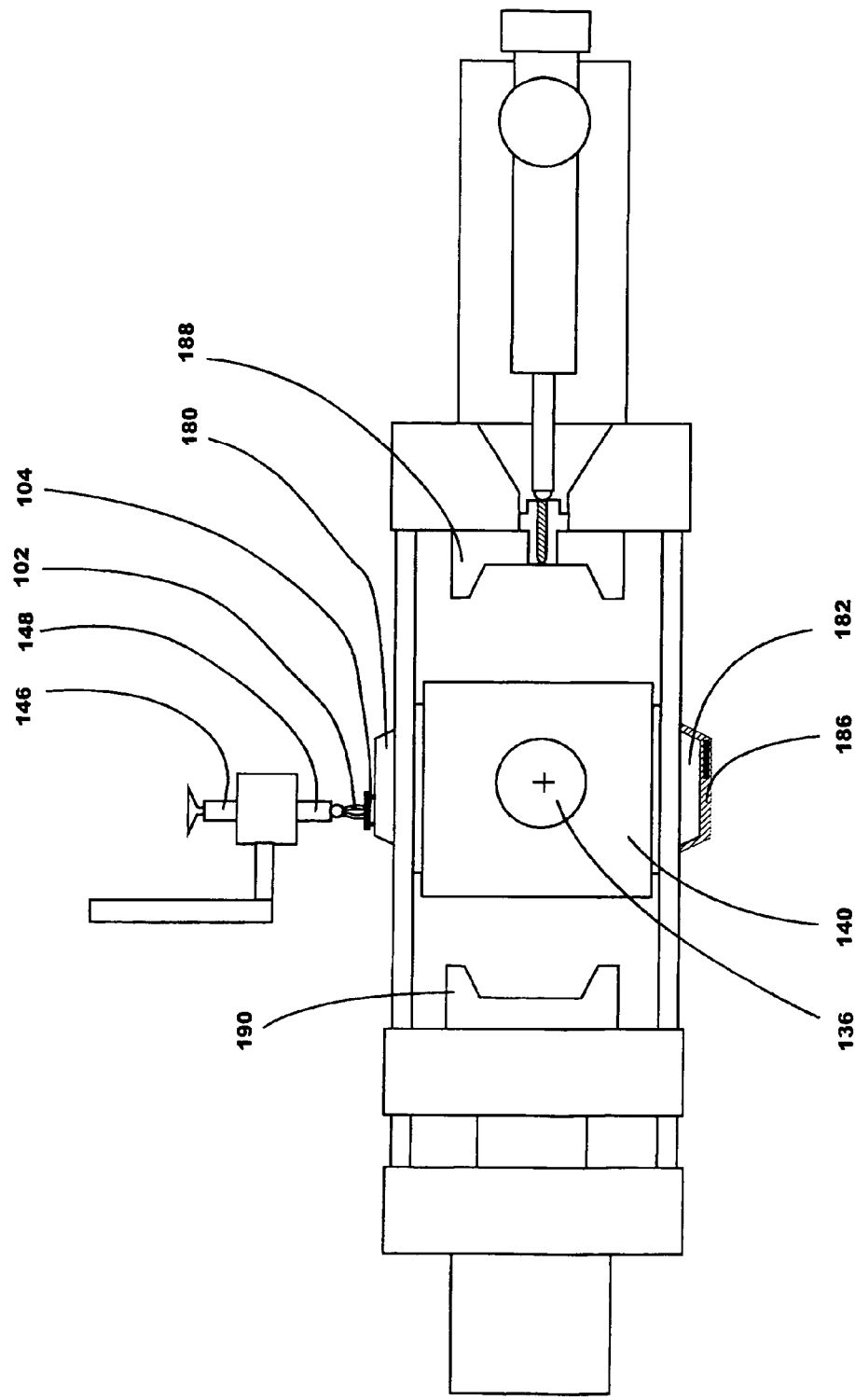

Referring to FIG. 14, when molding of the part 186 is complete, the clamp opens the molds, and the rotary drive 136 rotates the turret block 140 ninety degrees to position the secondary mold half 180 in position to receive the fiber preform 104 from the fibrous-insert insert generating mechanism 102. The secondary mold half 182 likewise rotates ninety degrees to a position where the molded part 186 can be cooled or otherwise can be treated.

Figure 15:
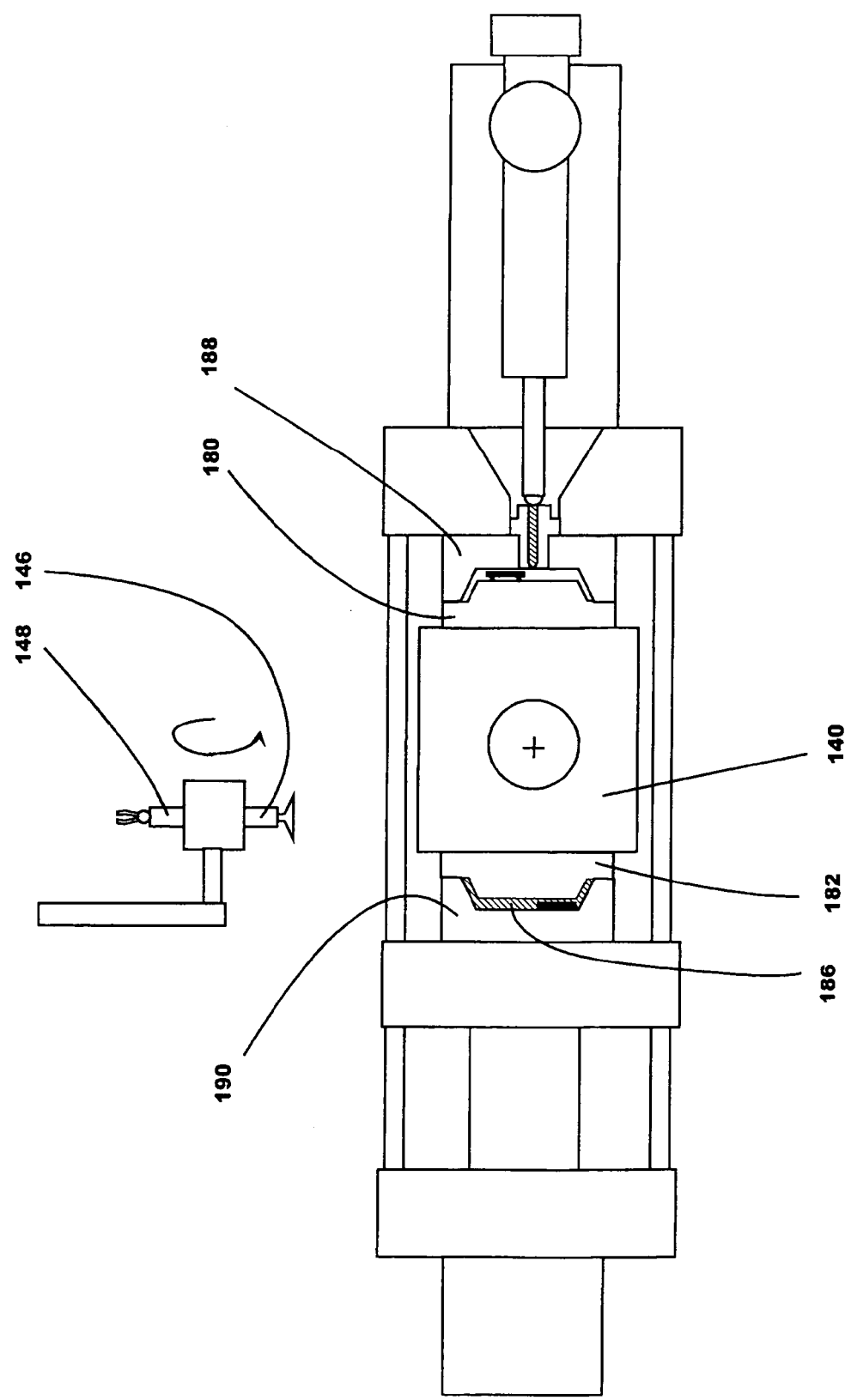

Referring to FIG. 15, after the fiber preform 104 is generated and mounted on the secondary mold half 180, the turret block 140 is rotated another ninety degrees. During this part of the cycle, the end-of-arm drives 146 and 148 are withdrawn and then rotated through one hundred and eighty degrees. This enables the drive 146 to be in position to receive a molded part 186 upon the next rotation of the block 140 and the drive 148 to generate or to retrieve a newly generated fibrous insert. A molding material is now injected into the mold cavity formed by the secondary mold half 180 and the primary mold half 188 to form a new molded part. Optionally, the part 186 held by the secondary mold half 182 may be further heat treated (such as cooling, etc) while held in the position shown in FIG. 15 by way of a primary mold half 190.

Figure 16:
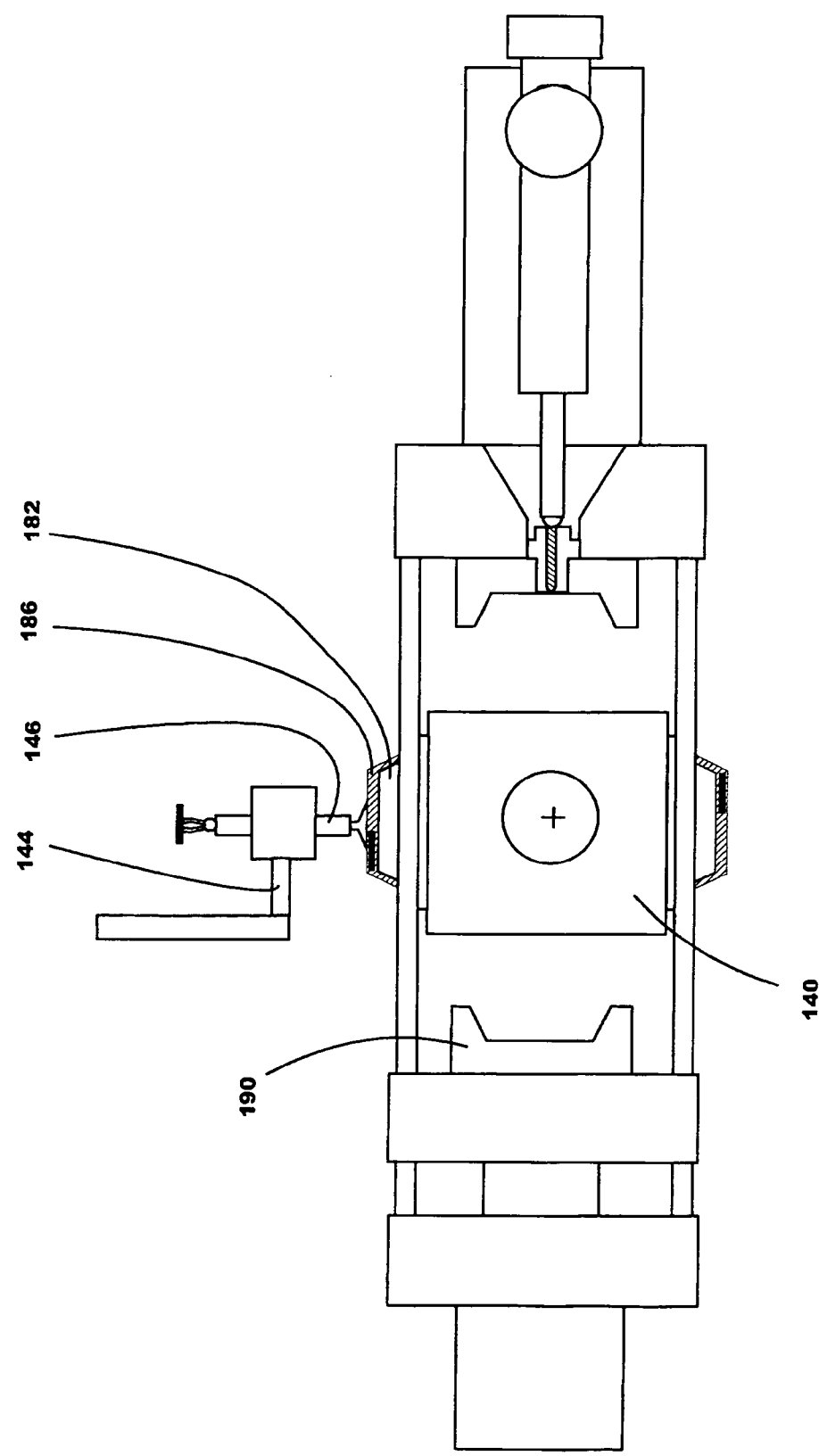

Referring to FIG. 16, the robot arm 144 is moved to position the drive 146 adjacent the secondary mold half 182. In this position the molded part 186 in the secondary mold half 182 can be retrieved and the molding process repeated to mold another part when the turret block 140 is next rotated to a position corresponding to the position shown in FIG. 13.

The description of the exemplary embodiments provides examples of the present invention, and these examples do not limit the scope of the present invention. It is understood that the scope of the present invention is limited by the claims. The concepts described above may be adapted for specific conditions and/or functions, and may be further extended to a variety of other applications that are within the scope of the present invention. Having thus described the exemplary embodiments, it will be apparent that modifications and enhancements are possible without departing from the concepts as described.

What is claimed is:

1. A molding system, comprising:
   molding system elements configured to process a molding material;
   a mold surface configured to cooperate with the molding system elements; and
   a fibrous-insert generating mechanism configured to wind a fibrous insert onto a fiber-receiving fixture, the fiber-receiving fixture is configured to cooperate with a fiber-transfer mechanism, the fiber-transfer mechanism is configured to transfer the fibrous insert from the fiber-receiving fixture to another fiber-receiving fixture extending from the mold surface, the mold surface, in use, encapsulates the fibrous insert received by the mold surface with the molding material, at least in part.

2. The molding system of claim 1, wherein the mold surface includes the fiber-receiving fixture, and the fibrous-insert generating mechanism is configured to wind the fibrous insert on the fiber-receiving fixture.

3. The molding system of claim 1, wherein the fibrous-insert generating mechanism is configured to cooperate with the fiber-receiving fixture extending from the mold surface.

4. The molding system of claim 1, wherein the fibrous insert is configured to be heated by a heater prior to encapsulating the molding material to the fibrous insert.

5. The molding system of claim 1, wherein:
   the molding system elements include any one of:
   a mold-supporting assembly configured to support the mold surface;
   an injection unit configured to inject the molding material into a mold cavity defined at least in part by the mold surface;
   a clamping mechanism configured to clamp the mold surface; and
   any combination and permutation thereof.

6. The molding system of claim 1, wherein the mold surface is defined by a mold, the mold includes:
   a primary mold half; and
   a secondary mold half configured to cooperate with the primary mold half to define a mold cavity.

7. The molding system of claim 1, wherein the mold surface is defined by a mold, the mold includes:
   a primary mold half; and
   a secondary mold half configured to cooperate with the primary mold half to define a mold cavity, the secondary mold half is a member of a set of secondary mold halves.

8. The molding system of claim 7, wherein each secondary mold half of the set of secondary mold halves is configured to:
   define the mold surface,
   cooperate with the fibrous-insert generating mechanism,
   move relative to the primary mold half,
   encapsulate, in cooperation with the primary mold half, the molding material, at least in part, to the fibrous insert.

9. The molding system of claim 7, wherein each secondary mold half of the set of secondary mold halves is configured to receive the fibrous insert from the fiber-transfer mechanism.

10. The molding system of claim 7, wherein each secondary mold half of the set of secondary mold halves is configured to receive the fibrous insert from the fiber-transfer mechanism, the fiber-transfer mechanism is configured to transfer the fibrous insert from the fibrous-insert generating mechanism over to a selected secondary mold half of the set of secondary mold halves.

11. The molding system of claim 7, wherein each secondary mold half of the set of secondary mold halves is configured to:
   receive, at a position offline relative to the primary mold half the fibrous insert,
   mold, at a position inline relative to the primary mold half the molding material to the fibrous insert, and
   be movable between an inline position and an offline position, relative to the primary mold half.

12. The molding system of claim 7, wherein a selected secondary mold half of the set of secondary mold halves is configured to receive the fibrous insert, and another selected secondary mold half of the set of secondary mold halves is configured to mold the molding material to another fibrous insert in cooperation with the primary mold half while the selected secondary mold half receives the fibrous insert.

13. The molding system of claim 7, wherein each secondary mold half of the set of secondary mold halves is configured to include a retractable pin, the retractable pin is configured to receive and hold the fibrous insert, the retractable pin is configured to retract away from the fibrous insert responsive to encapsulating the fibrous insert at least in part.

14. The molding system of claim 7, wherein each secondary mold half of the set of secondary mold halves is configured to maintain a differential air pressure having sufficient strength to hold the fibrous insert, and to deactivate the differential air pressure responsive to encapsulating the fibrous insert at least in part.

15. The molding system of claim 7, wherein the set of secondary mold halves are configured to be supported and moved by a mold-moving assembly, the mold-moving assembly is configured to rotate along any one of a vertically-aligned axis and a horizontally-aligned axis.

16. The molding system of claim 7, further comprising a mold-moving assembly configured to support and to move the set of secondary mold halves relative to the primary mold half.

17. The molding system of claim 7, further comprising an injection unit configured to inject the molding material into the mold cavity defined by the primary mold half and a selected secondary mold half of the set of secondary mold halves.

18. The molding system of claim 7, further comprising a clamping mechanism configured to clamp the primary mold half against a selected secondary mold half of the set of secondary mold halves.

19. A molding system, comprising:
a fibrous-insert generating mechanism configured to wind a fibrous insert onto a fiber-receiving fixture, so that a fiber-transfer mechanism may transfer the fibrous insert from the fiber-receiving fixture to another fiber-receiving fixture extending from a mold surface, the mold surface, in use, encapsulates the fibrous insert received by the mold surface with a molding material, at least in part, the molding material processed by molding system elements, the mold surface configured to cooperate with the molding system elements.

20. The molding system of claim 19, wherein the mold surface includes the fiber-receiving fixture, and the fibrous-insert generating mechanism is configured to wind the fibrous insert on the fiber-receiving fixture.

21. The molding system of claim 19, wherein the fibrous-insert generating mechanism is configured to cooperate with the fiber-receiving fixture, the fiber-receiving fixture extends from the mold surface.

22. The molding system of claim 19, wherein:
the fibrous insert is configured to be heated by a heater prior to encapsulating the molding material, at least in part, to the fibrous insert.

23. The molding system of claim 19, wherein:
the molding system elements include any one of:
a mold-supporting assembly configured to support the mold surface;
an injection unit configured to inject the molding material into a mold cavity defined at least in art by the mold surface;
a clamping mechanism configured to clamp the mold surface; and
any combination and permutation thereof.

24. The molding system of claim 19, wherein:
the mold surface is defined by a mold, the mold includes:
a primary mold half; and
a secondary mold half configured to cooperate with the primary mold half to define a mold cavity.

25. The molding system of claim 19, wherein:
the mold surface is defined by a mold, the mold includes:
a primary mold half; and
a secondary mold half configured to cooperate with the primary mold half to define a mold cavity, the secondary mold half is a member of a set of secondary mold halves.

26. The molding system of claim 25, wherein:
each secondary mold half of the set of secondary mold halves is configured to:
define the mold surface,
cooperate with the fibrous-insert generating mechanism,
move relative to the primary mold half,
encapsulate, in cooperation with the primary mold half the molding material, at least in part, to the fibrous insert.

27. The molding system of claim 25, wherein each secondary mold half of the set of secondary mold halves is configured to receive the fibrous insert from the fiber-transfer mechanism.

28. The molding system of claim 25, wherein each secondary mold half of the set of secondary mold halves is configured to receive the fibrous insert from the fiber-transfer mechanism, the fiber-transfer mechanism is configured to transfer the fibrous insert from the fibrous-insert generating mechanism over to a selected secondary mold half of the set of secondary mold halves.

29. The molding system of claim 25, wherein:
each secondary mold half of the set of secondary mold halves is configured to:
receive, at a position offline relative to the primary mold half, the fibrous insert,
mold, at a position inline relative to the primary mold half, the molding material to the fibrous insert, and
be movable between an inline position and an offline position relative to the primary mold half.

30. The molding system of claim 25, wherein a selected secondary mold half of the set of secondary mold halves is configured to receive the fibrous insert, and another selected secondary mold half of the set of secondary mold halves is configured to mold the molding material to another fibrous insert in cooperation with the primary mold half while the selected secondary mold half receives the fibrous insert.

31. The molding system of claim 25, wherein each secondary mold half of the set of secondary mold halves is configured to include a retractable pin, the retractable pin is configured to receive and hold the fibrous insert, the retractable pin is configured to retract away from the fibrous insert responsive to encapsulating the fibrous insert at least in part.

32. The molding system of claim 25, wherein each secondary mold half of the set of secondary mold halves is configured to maintain a differential air pressure having sufficient strength to hold the fibrous insert, and to deactivate the differential air pressure responsive to encapsulating the fibrous insert at least in part.

33. The molding system of claim 25, wherein the set of secondary mold halves are configured to be supported and moved by a mold-moving assembly, the mold-moving assembly is configured to rotate along any one of a vertically-aligned axis and a horizontally-aligned axis.

34. The molding system of claim 25, further comprising a mold-moving assembly configured to support and to move the set of secondary mold halves relative to the primary mold half.

35. The molding system of claim 25, further comprising an injection unit configured to inject the molding material into the mold cavity defined by the primary mold half and a selected secondary mold half of the set of secondary mold halves.

36. The molding system of claim 25, further comprising a clamping mechanism configured to clamp the primary mold half against a selected secondary mold half of the set of secondary mold halves.

37. A molding system, comprising:
a fiber-receiving fixture configured to:
cooperate with a mold surface, and
cooperate with a fibrous-insert generating mechanism configured to wind a fibrous insert onto the fiber-receiving fixture,
cooperate with a fiber-transfer mechanism, the fiber-transfer mechanism is configured to transfer the fibrous insert from the fiber-receiving fixture to another fiber-receiving fixture extending from the mold surface, the mold surface, in use, encapsulates the fibrous insert received by the mold surface with a molding material, at least in part, the molding material processed by molding system elements, the mold surface configured to cooperate with the molding system elements.

38. The molding system of claim 37, wherein the mold surface includes the fiber-receiving fixture, and the fibrous-insert generating mechanism is configured to wind the fibrous insert on the fiber-receiving fixture.

39. The molding system of claim 37, wherein the fiber-receiving fixture extends from the mold surface.

40. The molding system of claim 37, wherein:
the fibrous insert is configured to be heated by a heater prior to encapsulating the molding material, at least in part, to the fibrous insert.

41. The molding system of claim 37, wherein:
the molding system elements include any one of:
a mold-supporting assembly configured to support the mold surface;
an injection unit configured to inject the molding material into a mold cavity defined at least in part by the mold surface;
a clamping mechanism configured to clamp the mold surface; and
any combination and permutation thereof.

42. The molding system of claim 37, wherein:
the mold surface is defined by a mold, the mold includes:
a primary mold half; and
a secondary mold half configured to cooperate with the primary mold half to define a mold cavity.

43. The molding system of claim 37, wherein:
the mold surface is defined by a mold, the mold includes:
a primary mold half; and
a secondary mold half configured to cooperate with the primary mold half to define a mold cavity, the secondary mold half is a member of a set of secondary mold halves.

44. The molding system of claim 43, wherein:
each secondary mold half of the set of secondary mold halves is configured to:
define the mold surface,
cooperate with the fibrous-insert generating mechanism,
move relative to the primary mold half,
encapsulate, in cooperation with the primary mold half, the molding material, at least in part, to the fibrous insert.

45. The molding system of claim 43, wherein each secondary mold half of the set of secondary mold halves is configured to receive the fibrous insert from the fiber-transfer mechanism.

46. The molding system of claim 43, wherein each secondary mold half of the set of secondary mold halves is configured to receive the fibrous insert from the fiber-transfer mechanism, the fiber-transfer mechanism is configured to transfer the fibrous insert from the fibrous-insert generating mechanism over to a selected secondary mold half of the set of secondary mold halves.

47. The molding system of claim 43, wherein:
each secondary mold half of the set of secondary mold halves is configured to:
receive, at a position offline relative to the primary mold half, the fibrous insert,
mold, at a position inline relative to the primary mold half, the molding material to the fibrous insert, and
be movable between an inline position and an offline position relative to the primary mold half.

48. The molding system of claim 43, wherein a selected secondary mold half of the set of secondary mold halves is configured to receive the fibrous insert, and another selected secondary mold half of the set of secondary mold halves is configured to mold the molding material to another fibrous insert in cooperation with the primary mold half while the selected secondary mold half receives the fibrous insert.

49. The molding system of claim 43, wherein each secondary mold half of the set of secondary mold halves is configured to include a retractable pin, the retractable pin is configured to receive and hold the fibrous insert, the retractable pin is configured to retract away from the fibrous insert responsive to encapsulating the fibrous insert at least in part.

50. The molding system of claim 43, wherein each secondary mold half of the set of secondary mold halves is configured to maintain a differential air pressure having sufficient strength to hold the fibrous insert, and to deactivate the differential air pressure responsive to encapsulating the fibrous insert at least in part.

51. The molding system of claim 43, wherein the set of secondary mold halves are configured to be supported and moved by a mold-moving assembly, the mold-moving assembly is configured to rotate along any one of a vertically-aligned axis and a horizontally-aligned axis.

52. The molding system of claim 43, further comprising a mold-moving assembly configured to support and to move the set of secondary mold halves relative to the primary mold half.

53. The molding system of claim 43, further comprising an injection unit configured to inject the molding material into the mold cavity defined by the primary mold half and a selected secondary mold half of the set of secondary mold halves.

54. The molding system of claim 43, further comprising a clamping mechanism configured to clamp the primary mold half against a selected secondary mold half of the set of secondary mold halves.

55. A molding system, comprising:
a fiber-receiving fixture configured to cooperate with:
a fibrous-insert generating mechanism configured to wind a fibrous insert onto the fiber-receiving fixture, and
a fiber-transfer mechanism configured to transfer the fibrous insert from the fiber-receiving fixture to another fiber-receiving fixture extending from a mold surface,
wherein the molding system includes molding system elements configured to process a molding material,
wherein the mold surface is configured to:
cooperate with the molding system elements; and
encapsulate the fibrous insert received by the mold surface with the molding material, at least in part.

56. The molding system of claim 55, wherein the mold surface includes the fiber-receiving fixture, and the fibrous-insert generating mechanism is configured to wind the fibrous insert on the fiber-receiving fixture.

57. The molding system of claim 55, wherein the fibrous-insert generating mechanism is configured to cooperate with the fiber-receiving fixture extending from the mold surface.

58. The molding system of claim 55, wherein:
the fibrous insert is configured to be heated by a heater prior to encapsulating the molding material to the fibrous insert.

59. The molding system of claim 55, wherein:
the molding system elements include any one of:

a mold-supporting assembly configured to support the mold surface;

an injection unit configured to inject the molding material into a mold cavity defined at least in part by the mold surface;

a clamping mechanism configured to clamp the mold surface; and any combination and permutation thereof.

60. The molding system of claim 55, wherein:
the mold surface is defined by a mold, the mold includes:
  a primary mold half; and
  a secondary mold half configured to cooperate with the primary mold half to define a mold cavity.

61. The molding system of claim 55, wherein:
the mold surface is defined by a mold, the mold includes:
  a primary mold half; and
  a secondary mold half configured to cooperate with the primary mold half to define a mold cavity, the secondary mold half is a member of a set of secondary mold halves.

62. The molding system of claim 61, wherein:
each secondary mold half of the set of secondary mold halves is configured to:
  define the mold surface,
  cooperate with the fibrous-insert generating mechanism,
  move relative to the primary mold half,
  encapsulate, in cooperation with the primary mold half the, molding material, at least in part, to the fibrous insert.

63. The molding system of claim 61, wherein each secondary mold half of the set of secondary mold halves is configured to receive the fibrous insert from the fiber-transfer mechanism.

64. The molding system of claim 61, wherein each secondary mold half of the set of secondary mold halves is configured to receive the fibrous insert from the fiber-transfer mechanism, the fiber-transfer mechanism is configured to transfer the fibrous insert from the fibrous-insert generating mechanism over to a selected secondary mold half of the set of secondary mold halves.

65. The molding system of claim 61, wherein:
each secondary mold half of the set of secondary mold halves is configured to:
  receive, at a position offline relative to the primary mold half, the fibrous insert,
  mold, at a position inline relative to the primary mold half, the molding material to the fibrous insert, and
  be movable between an inline position and an offline position relative to the primary mold half.

66. The molding system of claim 61, wherein a selected secondary mold half of the set of secondary mold halves is configured to receive the fibrous insert, and another selected secondary mold half of the set of secondary mold halves is configured to mold the molding material to another fibrous insert in cooperation with the primary mold half while the selected secondary mold half receives the fibrous insert.

67. The molding system of claim 61, wherein each secondary mold half of the set of secondary mold halves is configured to include a retractable pin, the retractable pin is configured to receive and hold the fibrous insert, the retractable pin is configured to retract away from the fibrous insert responsive to encapsulating the fibrous insert at least in part.

68. The molding system of claim 61, wherein each secondary mold half of the set of secondary mold halves is configured to maintain a differential air pressure having sufficient strength to hold the fibrous insert, and to deactivate the differential air pressure responsive to encapsulating the fibrous insert at least in part.

69. The molding system of claim 61, wherein the set of secondary mold halves are configured to be supported and moved by a mold-moving assembly, the mold-moving assembly is configured to rotate along any one of a vertically-aligned axis and a horizontally-aligned axis.

70. The molding system of claim 61, further comprising a mold-moving assembly configured to support and to move the set of secondary mold halves relative to the primary mold half.

71. The molding system of claim 61, further comprising an injection unit configured to inject the molding material into the mold cavity defined by the primary mold half and a selected secondary mold half of the set of secondary mold halves.

72. The molding system of claim 61, further comprising a clamping mechanism configured to clamp the primary mold half against a selected secondary mold half of the set of secondary mold halves.

* * * * *